United States Patent
Foor

(10) Patent No.: US 10,449,814 B2
(45) Date of Patent: Oct. 22, 2019

(54) TIRE PRESSURE MANAGEMENT SYSTEM

(71) Applicant: DANA HEAVY VEHICLE SYSTEMS GROUP, LLC, Maumee, OH (US)

(72) Inventor: William J. Foor, Clayton, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 36 days.

(21) Appl. No.: 15/531,124

(22) PCT Filed: Dec. 4, 2015

(86) PCT No.: PCT/US2015/063927
§ 371 (c)(1),
(2) Date: May 26, 2017

(87) PCT Pub. No.: WO2016/090218
PCT Pub. Date: Jun. 9, 2016

(65) Prior Publication Data
US 2017/0361667 A1    Dec. 21, 2017

Related U.S. Application Data

(60) Provisional application No. 62/087,548, filed on Dec. 4, 2014.

(51) Int. Cl.
*F16K 15/20* (2006.01)
*B60C 29/00* (2006.01)
(Continued)

(52) U.S. Cl.
CPC .......... *B60C 29/005* (2013.01); *B60C 23/003* (2013.01); *B60C 29/068* (2013.01);
(Continued)

(58) Field of Classification Search
CPC .......... Y10T 137/3584; Y10T 137/3646; Y10T 137/374; Y10T 137/7929; Y10T 137/9029
See application file for complete search history.

(56) References Cited

U.S. PATENT DOCUMENTS

| | | |
|---|---|---|
| 1,039,804 A | 10/1912 | Richart |
| 1,144,499 A | 6/1915 | Owens et al. |

(Continued)

FOREIGN PATENT DOCUMENTS

| | | |
|---|---|---|
| CN | 2614959 Y | 5/2004 |
| EP | 2170630 B1 | 3/2011 |
| EP | 2602517 A1 | 6/2013 |

OTHER PUBLICATIONS

European Patent Office, International Search Report with Written Opinion issued in PCT/US2015/063927, dated Mar. 1, 2016, 11 pages, European Patent Office, Rijswijk, Netherlands.

*Primary Examiner* — Robert K Arundale
(74) *Attorney, Agent, or Firm* — Marshall & Melhorn, LLC

(57) ABSTRACT

An assembly for a tire pressure management system includes a housing. The housing includes a first branch and a second branch. The second branch is oriented at an oblique angle with respect to the first branch. The first branch and the second branch are in fluid communication with each other and a main branch. The main branch is rotatable with respect to the first branch. A valve assembly is housed within the first branch. The valve assembly provides selective fluid communication between a portion of the tire pressure management system and the main branch. A pressure relief valve assembly is housed within the second branch. The pressure relief valve assembly provides selective fluid communication between the assembly and the atmosphere.

19 Claims, 6 Drawing Sheets

(51) Int. Cl.
   *B60C 23/00* (2006.01)
   *B60C 29/06* (2006.01)
   *F16K 15/02* (2006.01)
   *F16K 15/04* (2006.01)
   *F16K 17/04* (2006.01)

(52) U.S. Cl.
   CPC .......... *F16K 15/026* (2013.01); *F16K 15/044* (2013.01); *F16K 17/04* (2013.01); *Y10T 137/3584* (2015.04)

(56) References Cited

U.S. PATENT DOCUMENTS

| | | | |
|---|---|---|---|
| 1,183,071 A | 5/1916 | Kaiser | |
| 1,487,851 A * | 3/1924 | Hammond | B60C 23/0496 137/228 |
| 2,022,196 A | 11/1935 | Greco | |
| 3,312,213 A * | 4/1967 | Timm | A61F 5/05816 137/226 |
| 3,314,440 A | 4/1967 | Horowitz | |
| 4,015,623 A | 4/1977 | Wanstreet | |
| 4,015,624 A | 4/1977 | Wanstreet et al. | |
| 4,049,017 A * | 9/1977 | Jones | F16K 47/04 137/540 |
| 4,437,504 A | 3/1984 | Stumpe | |
| 4,641,698 A * | 2/1987 | Bitonti | B60C 23/003 137/223 |
| 5,054,511 A | 10/1991 | Tuan et al. | |
| 5,309,969 A | 5/1994 | Mittal | |
| 5,540,268 A | 7/1996 | Mittal | |
| 6,325,463 B1 * | 12/2001 | Sitter | B60B 7/002 301/108.1 |
| 2006/0108793 A1* | 5/2006 | McGee | F16L 19/0206 285/148.2 |
| 2011/0017317 A1 | 1/2011 | Pritschet | |
| 2012/0305101 A1 | 12/2012 | Merrill | |
| 2013/0282232 A1* | 10/2013 | Medley | B60C 23/003 701/34.4 |
| 2015/0272340 A1* | 10/2015 | Hopp | B62J 1/26 137/223 |

* cited by examiner

TIRE PRESSURE MANAGEMENT SYSTEM

CROSS-REFERENCE TO RELATED APPLICATION

This application is claiming the benefit, under 35 U.S.C. 119(e), of the provisional U.S. patent application which was granted Ser. No. 62/087,548 and filed on Dec. 4, 2014, the entire disclosure of which is hereby incorporated by reference.

BACKGROUND OF THE INVENTION

The invention relates to an assembly for a tire pressure management system. The invention also relates to a tire pressure management system having the assembly.

It is important to avoid overinflation or underinflation of a tire. Tire pressure management systems such as, for example, central tire inflation systems can be utilized to manually and/or automatically increase the pressure within a tire to a desired level. However, certain tire pressure management systems such as, for example, inflate and maintain systems are not configured to decrease tire pressure. Since these systems cannot decrease tire pressure, the tires can become overinflated do to an atmospheric pressure decrease and/or a temperature increase caused by a change to the environmental or operating conditions.

Therefore, it would be desirable to provide an assembly and a system which allows for tire inflation when an increase in tire pressure is required and prevents overinflation of the tire when the tire pressure increases.

BRIEF SUMMARY OF THE INVENTION

Embodiments of an assembly for a tire pressure management system are provided. In an embodiment, the assembly comprises a housing. The housing comprises a first branch and a second branch. The second branch is oriented at an oblique angle with respect to the first branch. The first branch and the second branch are in fluid communication with each other and a main branch. The main branch is rotatable with respect to the first branch. A valve assembly is housed within the first branch. The valve assembly provides selective fluid communication between a portion of the tire pressure management system and the main branch. A pressure relief valve assembly is housed within the second branch. The pressure relief valve assembly provides selective fluid communication between the assembly and the atmosphere.

BRIEF DESCRIPTION OF THE SEVERAL VIEWS OF THE DRAWING

The above, as well as other advantages of the present invention will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Embodiments of an assembly 10, 200, 300 and a tire pressure management system 12 made therewith are described below. Preferably, the tire pressure management system is utilized with a vehicle (not depicted). More preferably, the tire pressure management system is a central tire inflation system (CTIS) for a commercial vehicle. However, the tire pressure management system described herein may have applications in vehicles for both light and heavy duty and for passenger, commercial, and off-highway vehicles. Furthermore, it would be understood by one of ordinary skill in the art that the tire pressure management system could have industrial, locomotive, military and aerospace applications.

Figure 1:
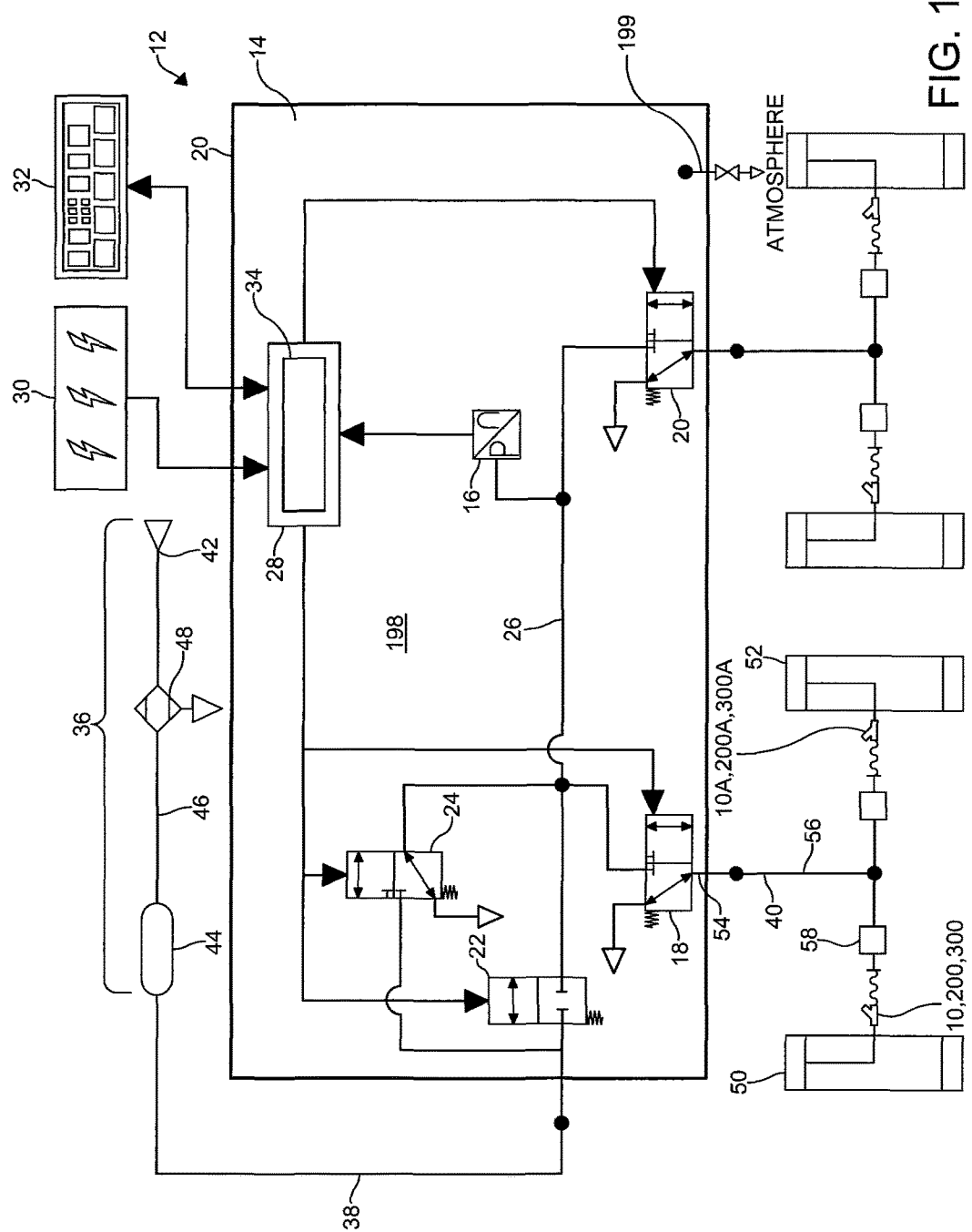
FIG. 1 depicts a schematic view of an embodiment of a tire pressure management system in accordance with the invention.

A schematic illustration of an embodiment of the tire pressure management system 12 depicting a location for the embodiments of the assembly 10, 200, 300 in relation to other portions of the tire pressure management system is illustrated in FIG. 1. In certain embodiments (not depicted), the tire pressure management system may be able to increase and decrease tire pressure. However, it is preferred that the tire pressure management system can only increase and maintain tire pressure.

The tire pressure management system 12 comprises a control unit 14. The control unit 14 comprises a pressure sensor 16 for measuring the pressure of air. Preferably, the control unit 14 also comprises a plurality of valve assemblies 18, 20, 22, 24, which are of the solenoid variety, and a first fluid conduit 26 for controlling the flow of and directing air through the system 12.

The control unit 14 also comprises an electronic control portion 28. The electronic control portion 28 may receive input signals from the pressure sensor 16, a power supply 30 and one or more additional sensors (not depicted) such as, for example, a load sensor and a speed sensor. The electronic control portion 28 may also receive input signals from an operator control device 32. The electronic control portion 28 may include a microprocessor 34 operating under the control of a set of programming instructions, which may also be referred to as software. The electronic control portion 28 may include a memory (not depicted) in which programming instructions are stored. The memory can also store identification codes, tire pressure records and/or user inputs over a period of time.

The electronic control portion 28 outputs signals to the valve assemblies 18-24 to open or close the valve assemblies 18-24. The electronic control portion 28 may also output signals to a display device (not depicted). The display device may be included as a part of the operator control device 32 or a freestanding device.

The control unit 14 selectively communicates with an air supply 36 via an air supply circuit 38. The pressure sensor 16 measures the pressure of the air supply 36 via the air supply circuit 38 and the first fluid conduit 26. The control unit 14 also preferably comprises a control valve assembly 24. The control valve assembly 24 is provided with an orifice which is smaller than the orifice of the supply valve assembly 22 and is utilized to provide a bleed of air from the air supply 36 to a fluid control circuit 40. Preferably, the supply valve assembly 22 and control valve assembly 24 are of the solenoid variety as mentioned above.

The air supply 36 is utilized to determine a tire pressure and, if needed, increase the tire pressure. The air supply 36 is preferably provided by an air compressor 42 attached to the vehicle. Preferably, the air supply 36 also comprises a reservoir 44 such as, for example, a wet tank. The compressor 42 is in fluid communication with the reservoir 44 via a supply conduit 46. The air compressor 42 supplies pressurized air to the reservoir 44 for storage therein. Pressurized air from the air supply 36 is provided to the air supply circuit 38 via the reservoir 44. In certain embodiments, a drier 48 is provided for removing water from the air supply 36. A filter (not depicted) may also be interposed in the air supply circuit 38 or the supply conduit 46.

The control unit 14 is also selectively in fluid communication with the fluid control circuit 40. The fluid control circuit 40 is utilized to provide fluid communication between the control unit 14 and one or more tires 50, 52. Preferably, fluid communication between the control unit 14 and fluid control circuit 40 is controlled by opening or closing a channel valve assembly 18.

Each tire 50, 52 contains air at a certain pressure which will hereinafter be referred to herein as tire pressure. The assembly 10, 200, 300 and tire pressure management system 12 will be described below with reference to the tire pressure of one tire 50. However, the tire pressure management system 12 may at certain times be in fluid communication with a plurality of tires 50, 52 in order to check, increase and/or decrease tire pressure.

Preferably, the tire pressure is equal to a target tire pressure. The target tire pressure can be selected to be a desired pressure. After the target tire pressure is selected, it is programmed into the control unit 14. If it is determined that the tire pressure is less than the target tire pressure, the tire pressure can be increased.

The fluid control circuit 40 may comprise one or more fluid conduits 54, 56 and a rotary seal assembly 58. Referring now to FIGS. 1-5, the assembly 10, 200, 300 is provided in fluid communication with the fluid control circuit 40. The fluid control circuit 40 will be described with reference to one assembly 10, 200, 300. However, as illustrated in FIG. 1, a plurality of assemblies 10, 10A, 200, 200A, 300, 300A may communicate with the fluid control circuit 40. For example, a first assembly 10, 200, 300 associated with a tire 50 on a drive axle of the vehicle could be provided and a second assembly 10A, 200A, 300A associated with another tire 52 on the drive axle could be provided. Preferably, the first assembly 10, 200, 300 and the second assembly 10A, 200A, 300A are similarly configured.

As best illustrated in FIGS. 2-5, the assembly 10, 200, 300 comprises a housing 60, 60A. The housing 60, 60A comprises a first branch 62 which houses a valve assembly 64 and a second branch 66 which houses a pressure relief valve assembly 68, 68A. The first branch 62 and the second branch 66 are in fluid communication with each other and a main branch 70.

As illustrated, the second branch 66 is oriented at an oblique angle with respect to the first branch 62 and the main branch 70. In certain embodiments, the first branch 62 has a centerline A1. The second branch 66 has a centerline A2 that is oriented at an oblique angle with respect to the centerline A1 of the first branch 62. Also, the centerline A2 of the second branch 66 is oriented at an oblique angle with respect to the centerline A3 of the main branch 70. The first branch 62 is aligned with and extends away from the main branch 70. Thus, it is preferred that the centerline A1 of the first branch 62 is aligned with a centerline A3 of the main branch 70.

In certain embodiments (not depicted), the housing may be formed in a unitary manner. However, as shown best in FIG. 3, it is preferred that the first branch 62 and the main branch 70 are formed as separate members. In this embodiment, the second branch 66 and the main branch 70 are formed in a unitary manner and the first branch 62 is secured to the main branch 70 with a fastener 72. It is preferred that the fastener 72 permits rotation of the main branch 70 with respect to the first branch 62 and vice versa. In an embodiment, the main branch has an axis of rotation that is aligned with its centerline A3. In this embodiment, it is also preferred that the axis of rotation is aligned with the centerline A1 of the first branch 62. In embodiments where the second branch 66 and the main branch 70 are formed in a unitary manner, the second branch 66 is not rotatable with respect to the main branch 70. However, in these embodiments, the second branch 66 is rotatable with the main branch 70 with respect to the first branch 62 and vice versa.

As illustrated and in an embodiment, the fastener 72 is a snap ring. In another embodiment (not depicted), the fastener is a wire. In this embodiment, the first branch 62 and the main branch 70 are secured together by a wire retention method. In other embodiments (not depicted), a fastener is not provided to secure the first branch to the main branch. In these embodiments, the first branch 62 and the main branch 70 are still secured together and formed as separate members so that the second branch 66 and the main branch 70 can rotate with respect to the first branch 62 and vice versa. However, in these embodiments, the first branch is secured to the main branch by interlocking a portion of the first branch and a portion of the main branch. In one such embodiment, the interlock between the first branch and the main branch is provided by positioning a portion of the main branch over the first branch via a crimping process.

A sealing member 74 such as, for example, an O-ring is disposed around an outer surface 76 of the first branch 62. Also, the sealing member 74 is provided between the first branch 62 and the main branch 70. In this position, the sealing member 74 provides a seal between the first branch 62 and the main branch 70 to ensure that pressurized air transferred through the assembly 10, 200, 300 does not escape to the atmosphere between the first branch 62 and the main branch 70.

Figure 5:
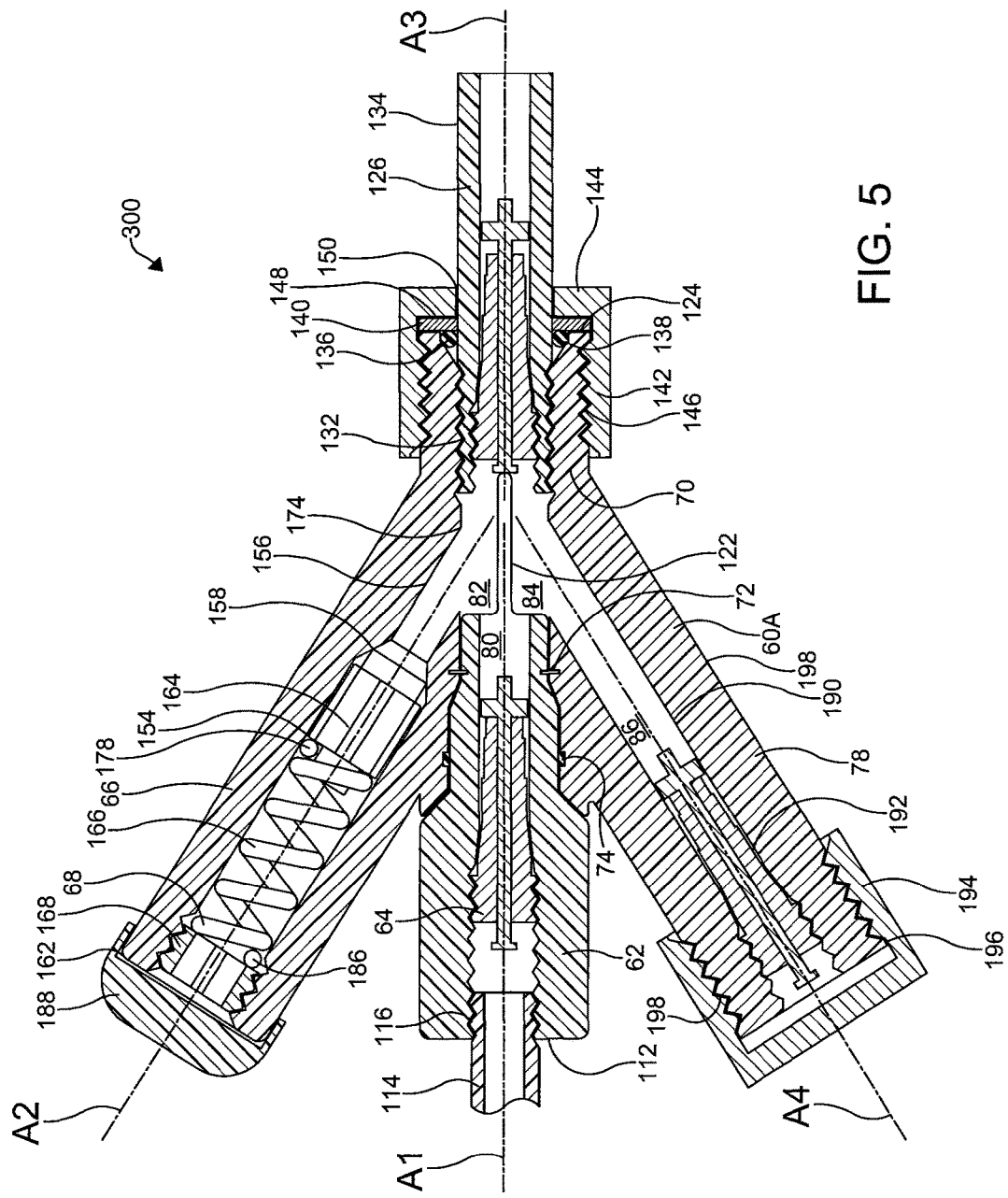
FIG. 5 is a cross-sectional view illustrating yet another embodiment of an assembly in accordance with the invention.

Referring now to FIG. 5, the housing 60A may comprise a third branch 78. Preferably, the third branch 78 is formed in a unitary manner with the second branch 66 and the main branch 70. In an embodiment like the one illustrated in FIG. 5, the third branch 78 is oriented at an oblique angle with respect to the first branch 62 and the main branch 70. The third branch 78 has a centerline A4 that is oriented at an oblique angle with respect to the centerline A1 of the first branch 62. Also, the centerline A4 of the third branch 78 is oriented at an oblique angle with respect to the centerline A3 of the main branch 70. When provided, the third branch 78 is in fluid communication with the first branch 62, the second branch 66, and the main branch 70.

Each branch 62, 66, 70, 78 has a fluid conduit 80, 82, 84, 86 that extends therethrough. The fluid conduits 80-86 are in fluid communication and permit fluid communication between the branches 62, 66, 70, 78. The second branch fluid conduit 82 is oriented at an oblique angle with respect to the first branch fluid conduit 80 and the main branch fluid conduit 84. Also, the third branch fluid conduit 86 is oriented at an oblique angle with respect to the first branch fluid conduit 80 and the main branch fluid conduit 84. Preferably, the first branch fluid conduit 80 and the main branch fluid conduit 84 are aligned with each other.

Figure 3:
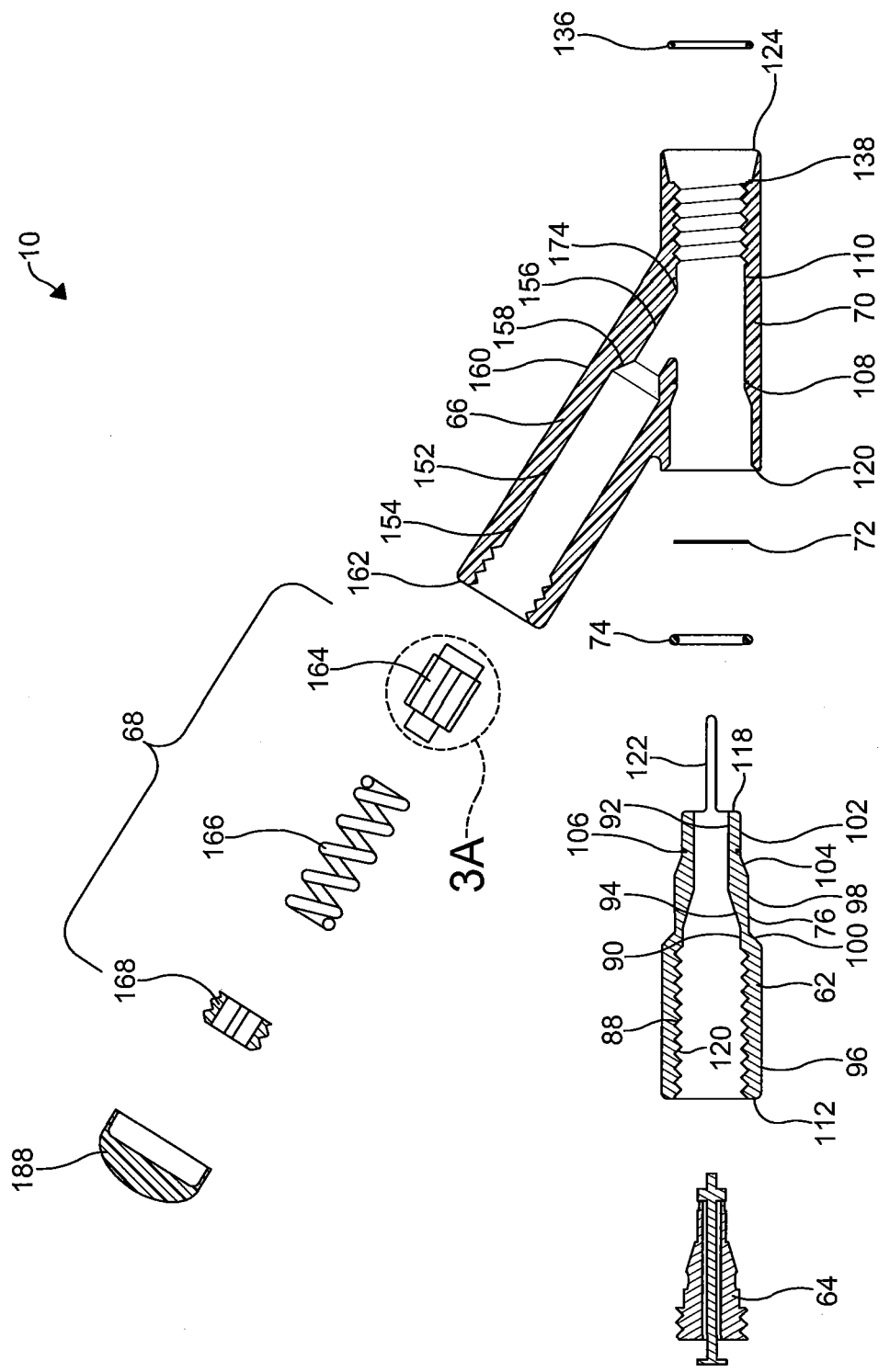
FIG. 3 is an exploded view of a portion of the assembly of FIG. 2 with certain portions of the assembly shown cross-sectioned.

The first branch 62 comprises an inner surface 88 which defines the first branch fluid conduit 80. Referring now to FIG. 3, the inner surface 88 comprises a first diameter portion 90 which is attached to a second diameter portion 92 via a ramped transition portion 94. Also, as noted above, the first branch 62 also has an outer surface 76. The outer surface 76 of the first branch 62 comprises a first diameter portion 96. The first diameter portion 96 is attached to a second diameter portion 98 via a first ramped transition portion 100. The second diameter portion 98 is attached to a third diameter portion 102 via a second ramped transition portion 104. The first diameter portion 96 is of a diameter which is greater than a diameter of the second diameter portion 98 and a diameter of the third diameter portion 102. The diameter of the second diameter portion 98 is greater than the diameter of the third diameter portion 102. The fastener 72 securing the first branch 62 to the main branch 70 is provided in a groove 106 formed in the third diameter portion 102 and a groove 108 formed in an inner surface 110 of the main branch 70. The groove 106 formed in the first branch 62 and is aligned with the groove 108 formed in the main branch 70.

Figure 2:
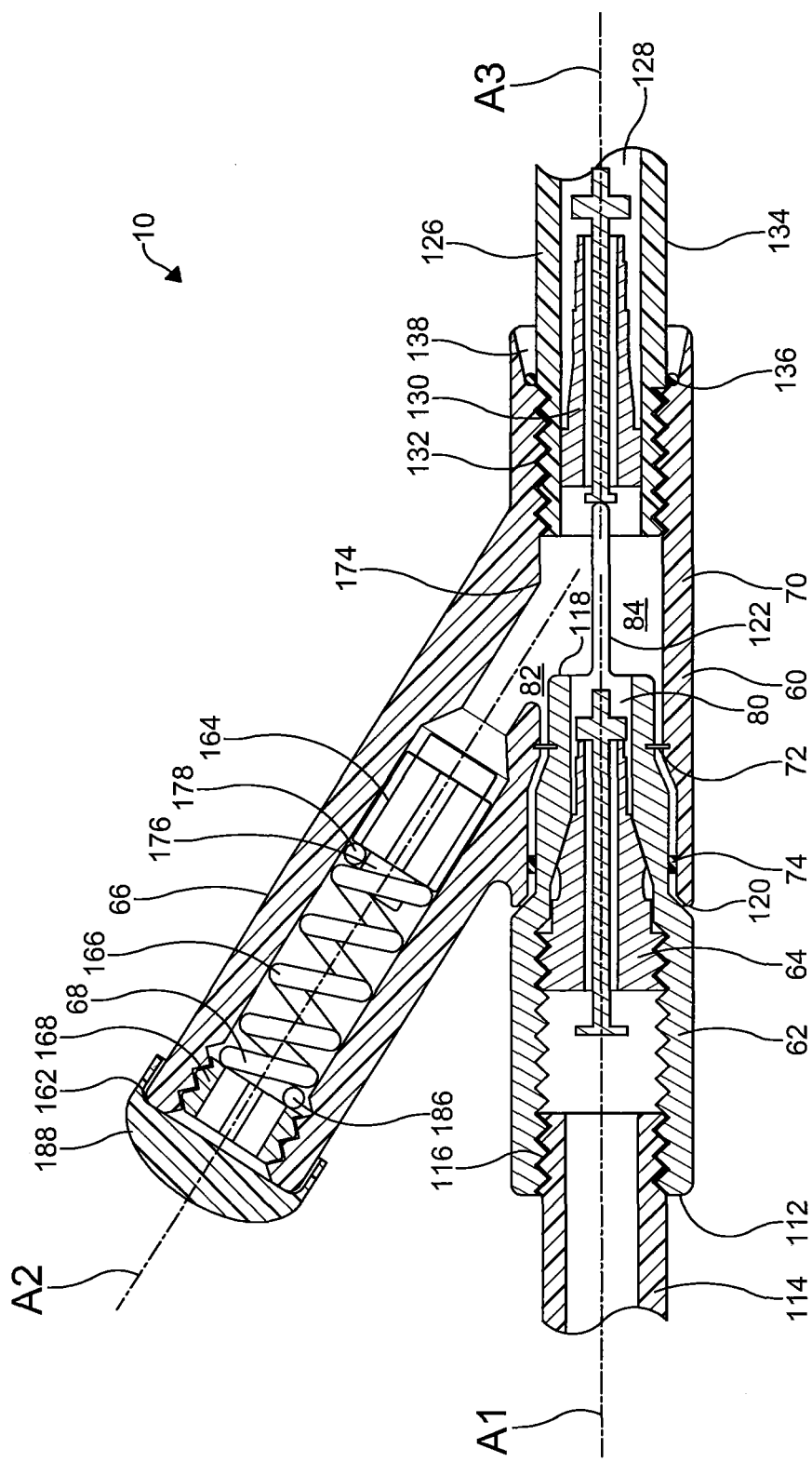
FIG. 2 is an enlarged cross-sectional view of a portion of the tire pressure management system of FIG. 1 illustrating an embodiment of an assembly in accordance with the invention.
Figure 4:
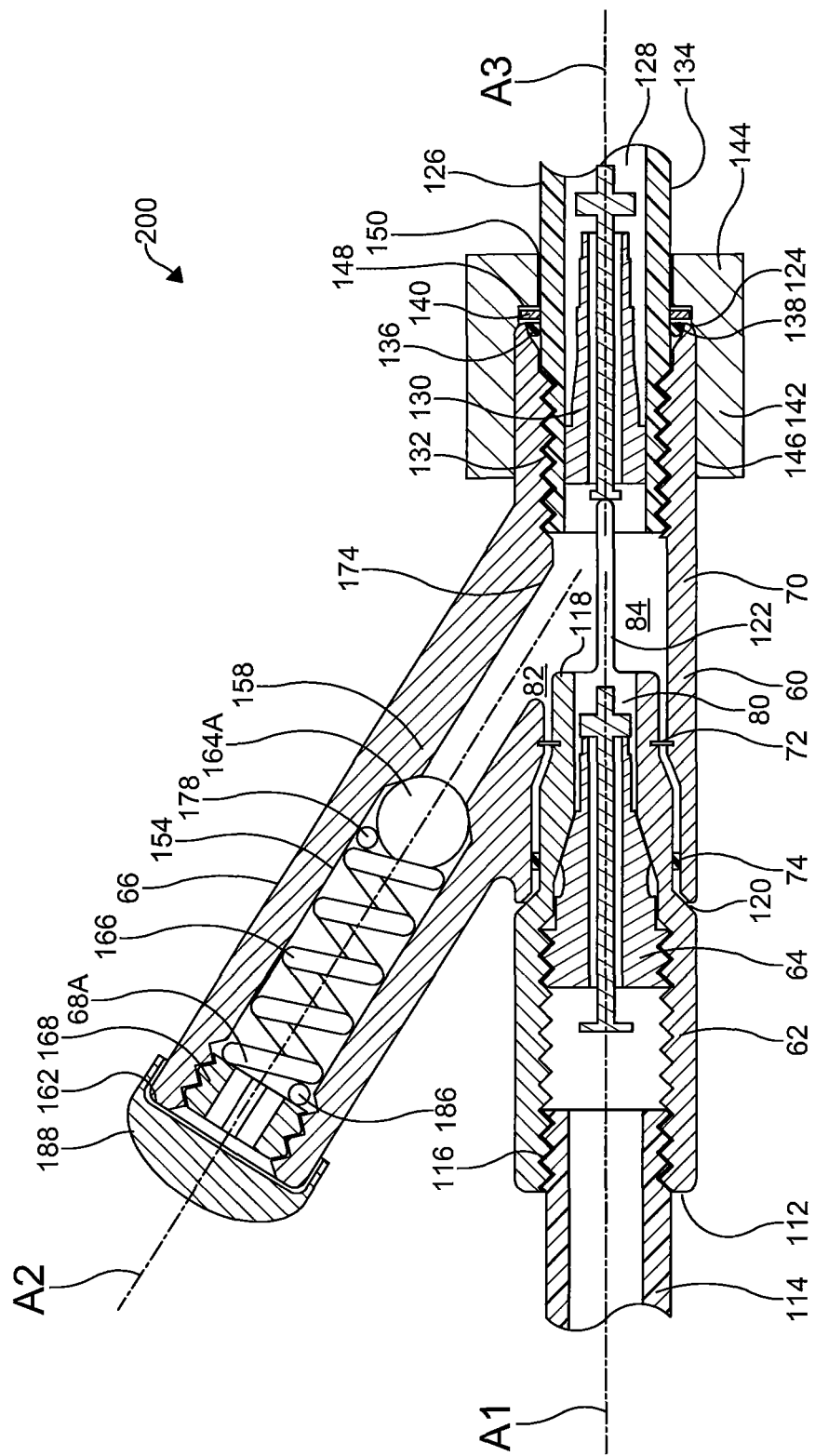
FIG. 4 is a cross-sectional view illustrating another embodiment of an assembly in accordance with the invention.

The first branch 62 comprises a first end 112. The first end 112 is open to allow for a portion of the tire pressure management system 12 to be secured to and in fluid communication with the assembly 10, 200, 300 as is shown in FIGS. 2, 4, and 5. The portion of the tire pressure management system 12 in fluid communication with the first branch 62 at the first end 112 may be, for example, a portion 114 of the fluid control circuit 40. In these embodiments, this portion 114 of the fluid control circuit 40 may be a hose member. It is preferred that the portion 114 of the fluid control circuit 40 permanently secured to first branch 62 is secured via a threaded connection 116.

Pressurized air is communicated from the air supply 36 through the fluid control circuit 40 and the first end 112 of the first branch 62 to the valve assembly 64 in order to inflate the tire 50. The valve assembly 64 provides selective fluid communication between the fluid control circuit 40 and the main branch 70 of the assembly 10, 200, 300.

The first branch 62 houses the valve assembly 64. Preferably, the valve assembly 64 is housed entirely within the first branch 62. Housing the valve assembly 64 within the first branch 62 helps extend the useful life certain portions of the tire pressure management system 12. For example, when a hose member is provided as a portion of the fluid control circuit 40 and is secured to the housing 60, 60A, it is desirable that the hose member is not continuously exposed to pressurized air from the tire 50 because such exposure may cause the hose member to fail. When a hose member is secured to the housing 60, 60A, the valve assembly 64 prevents the hose member from continuous exposure to pressurized air from the tire 50.

Preferably, the valve assembly 64 is a check valve. When the valve assembly 64 is a check valve, it is preferred that the check valve is of the Schrader variety. In embodiments where the valve assembly 64 is a check valve, valve assembly 64 is moveable from an open position to a closed position and vice versa. In these embodiments and during a tire pressure check or when the tire pressure is being increased, the valve assembly 64 is in or placed into the open position. In other embodiments (not depicted), the valve assembly may be a control valve. In embodiments where the valve assembly is a control valve, the valve assembly is moveable from an open position through a closed position and vice versa.

The air supply 36 is utilized to urge the valve assembly 64 to an open position. To open the valve assembly 64, the air supply 36 is placed into fluid communication with the valve assembly 64. Once the air supply 36 is in fluid communication with the valve assembly 64, the air supply 36 is maintained in fluid communication with the valve assembly 64 for a predetermined time to urge the valve assembly 64 to the open position. The valve assembly 64 is urged to the open position due to the pressure difference between the air supply 36 and the tire pressure. Once open, the valve assembly 64 can be maintained in an open position for a predetermined period of time to check the tire pressure and/or increase the tire pressure to the target tire pressure. The valve assembly 64 can be maintained in an open position utilizing the bleed air.

Referring back to FIG. 3, the first branch 62 also comprises a second end 118. The second end 118 is open which allows the first branch fluid conduit 80 to be in fluid communication with the main branch fluid conduit 84 and to be in fluid communication with the second branch fluid conduit 82 via main branch fluid conduit 84. A first receiving end 120 of the main branch 70 receives the second end 118 of the first branch 62. In an embodiment, the second diameter portion 98 and the third diameter portion 102 of the first branch outer surface 76 are received by the first receiving end 120 so that the inner surface 110 of the main branch 70 surrounds those portions 98, 102 of the first branch 62. As described above, the first branch 62 is secured to the main branch 70 with the fastener 72 and the sealing member 74 is disposed around the outer surface 76 of the first branch 62 to provide the seal between the first branch 62 and the main branch 70. As illustrated in FIG. 2, the sealing member 74 may be disposed around the second diameter portion 98 of the first branch outer surface 76. In other embodiments (not depicted), the sealing member may be disposed around the third diameter portion of the first branch outer surface.

As shown best in FIG. 3, a depressor member 122 is attached to the second end 118 of the first branch 62. The depressor member 122 is an elongated member. In certain embodiments, the depressor member 122 may be of a generally rectangular shape in cross-section. In other embodiments (not depicted), the depressor member may be of a generally hemispherical shape in cross-section, generally ovular shape in cross-section, or another cross-sectional shape. The depressor member 122 is aligned with the first branch fluid conduit 80 and, the main branch fluid conduit 84. Referring now to FIGS. 2-5, the depressor member 122 extends into the main branch 70 toward a second receiving end 124 of the main branch 70. More particularly, the depressor member 122 is positioned within the main branch fluid conduit 84.

The inner surface 110 of the main branch 70 defines the main branch fluid conduit 84. In an embodiment like the one shown in FIGS. 2-3, a portion of the inner surface 110 reduces in diameter from the first receiving end 120 toward the second receiving end 124. As illustrated best in FIGS. 2 and 4-5, a tire valve stem 126 is received by the second receiving end 102. The tire valve stem 126 defines a fluid conduit 128. The tire valve stem fluid conduit 128 is in fluid communication with the main branch fluid conduit 84. A tire valve 130 is disposed in the tire valve stem fluid conduit 128. It is preferred that the tire valve 130 is a check valve. A preferred type of check valve for use as the tire valve is the Schrader variety.

A portion of the depressor member 122 is provided in the tire valve stem 126. Within the tire valve stem 126, the depressor member 122 permanently contacts a portion of the tire valve 130 to maintain the tire valve in an open position. Maintaining the tire valve 130 in an open position allows the main branch 70 to be in continuous fluid communication with the tire 50 and the assembly 10, 200, 300 to communicate directly with the pressurized air in the tire 50.

Preferably, the main branch 70 and the tire valve stem 126 are attached via a threaded connection 132. In this embodiment, it is preferred that threads are provided on the inner surface 110 of the main branch 70 and an outer surface 134 of the tire valve stem 126. A sealing member 136 is provided adjacent the second receiving end 124 of the main branch 70. The sealing member 136 is housed within the main branch 70 and disposed around the outer surface 134 of the tire valve stem 126. In this position, the sealing member 136 is provided radially between the tire valve stem 126 and the main branch 70. A groove 138 may be provided in the inner surface 110 of the main branch 70 to help maintain the position the sealing member 136 between the tire valve stem 126 and the main branch 70. The sealing member 136 provides a seal between the housing 60, 60A and the tire valve stem 126 to ensure that pressurized air transferred through the assembly 10, 200, 300 does not escape to the atmosphere between the tire valve stem 126 and the main branch 70. In certain embodiments, the sealing member is an O-ring.

Referring now to FIGS. 4 and 5, the position of the sealing member 136 within the main branch 70 may be maintained by utilizing a washer 140 and a cap member 142. The washer 140 is disposed within the cap member 142 and abuts the second receiving end 124 of the main branch 70 and the sealing member 136. In this position, the washer 140 separates the sealing member 136 from an end wall 144 of the cap member 142. Preferably, the washer 140 is an annular member and has an opening which allows it to be disposed around a portion of the outer surface 134 of the tire valve stem 126. The cap member 142 houses the washer 140 and is disposed around a portion of and is secured to an outer surface 146 of the main branch 70. The cap member 142 is also disposed around a portion of the outer surface 134 of the tire valve stem 126. In this position, an inner surface 148 of the cap member end wall 144 abuts the washer 140 to ensure that axially movement of the sealing member 136 is prohibited. The cap member 142 comprises a center opening 150 formed in the end wall 144 which allows the cap member to be slid over the tire valve stem 126 when the assembly 10, 200, 300 is being connected to and disconnected from the tire valve stem 126.

As shown best in FIG. 3, the second branch 66 comprises an inner surface 152. The inner surface 152 defines the second branch fluid conduit 82. The inner surface 152 of the second branch 66 reduces in diameter from an elongated first diameter portion 154 to a second diameter portion 156 via a ramped transition portion 158. The second branch 66 also comprises an outer surface 160. The outer surface 160 of the second branch 66 is of a generally cylindrical shape.

Referring now to FIGS. 2-5, the second branch 66 comprises a first end 162. The first end 162 is open to permit pressurized air to be released to the atmosphere. Pressurized air is communicated to the atmosphere through the first end 162 via the pressure relief valve assembly 68, 68A. The second branch 66 houses the pressure relief valve assembly 68, 68A. Preferably, the pressure relief valve assembly 68, 68A is housed entirely within the second branch 66. The assembly 10, 200, 300 is selectively in fluid communication with the atmosphere via the pressure relief valve assembly 68, 68A.

The pressure relief valve assembly 68, 68A comprises a valve member 164, 164A. The valve member 164, 164A comprises a valve body 170, 170A. In an embodiment like the one illustrated in FIG. 3A, a cylindrical protuberance 176 extends from a first end 172 of the valve body 170. In this embodiment, a seal member 180 is provided at a second end 182 of the valve body 170. The seal member 180 is utilized to provide a seal between the valve member 164 and the inner surface 152 of the second branch 66. Preferably, the seal member 180 is elastomeric and provides the seal between the valve member 164 and the inner surface 152 on the ramped transition portion 158 of the inner surface 152 and near the second end 174 of the second branch 66.

Figure 3A:
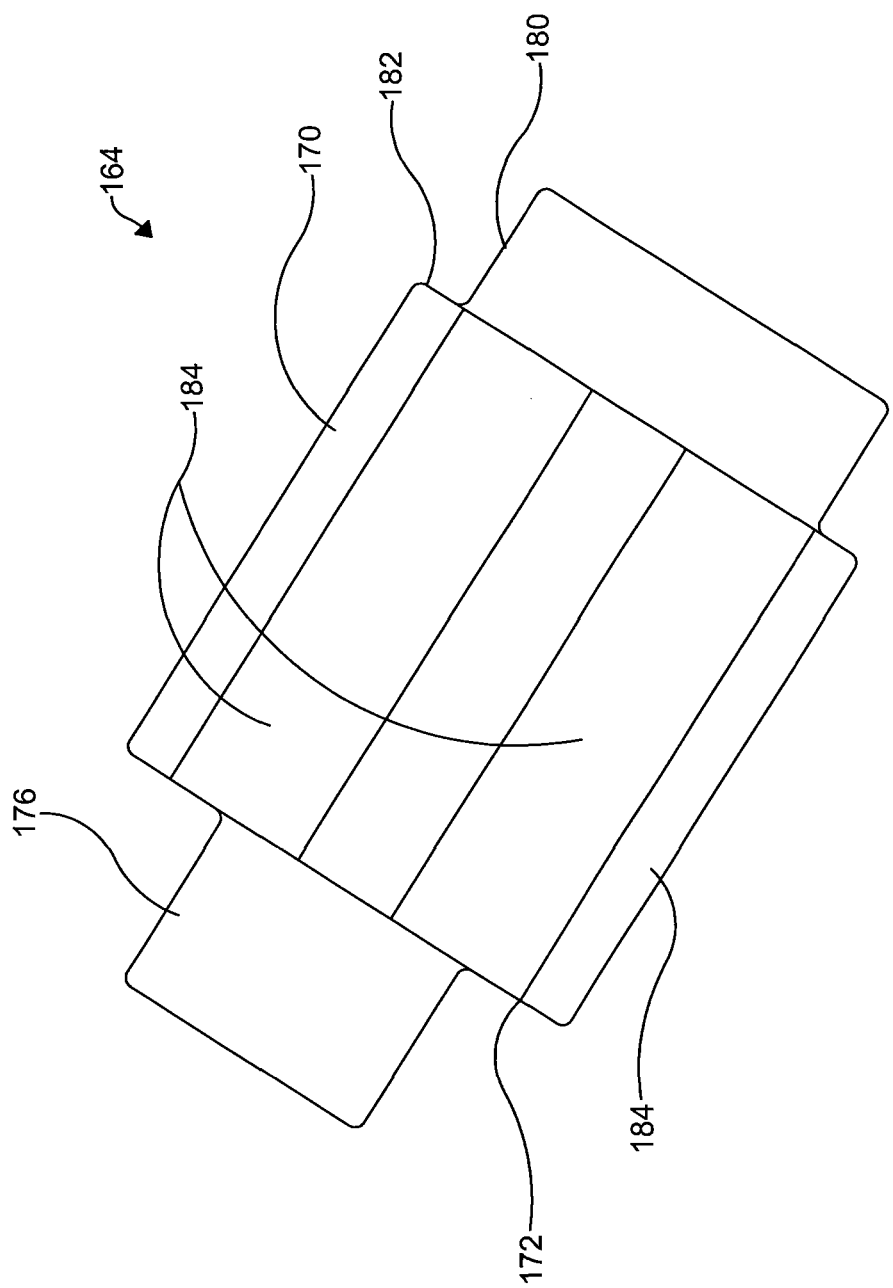
FIG. 3A is an enlarged view of a portion of FIG. 3.

As illustrated best in FIG. 3A, in certain embodiments, the valve body 170 is of a generally cylindrical shape. In these embodiments, one or more grooves 184 are formed in the valve body 170. Preferably, four grooves are formed in the valve body 170. It should be appreciated that in other embodiments (not depicted), more than four grooves or less than four grooves may be formed in the valve body. The grooves 184 are spaced apart from each other. Preferably, the grooves 184 are equally spaced apart. Each groove 184 extends from the first end 172 to the second end 182 of the valve body 170. When the pressure relief valve assembly 68 is open, each groove 184 directs a flow of pressurized air from the assembly 10, 300 to the atmosphere. In other embodiments, like the one illustrated in FIG. 4, the valve member 164A comprises a valve body of a spherical shape. In this embodiment, the valve body may be a ball. In this embodiment, when the pressure relief valve assembly 68A is open, pressurized air from the assembly 200 is directed around the valve body to the atmosphere.

In the embodiments illustrated in FIGS. 2 and 5, a biasing member 166 contacts the first end 172 of the valve body 170. In another embodiment like the one illustrated in FIG. 4, the biasing member 166 contacts a curvilinear surface of the valve member 164A. The biasing member 166 biases the valve member 164, 164A toward a second end 174 of the second branch 66. In the embodiments illustrated in FIGS. 2 and 5, the cylindrical protuberance 176 extends from the first end 172 of the valve body 170 to help maintain the position the biasing member 166 relative to the valve member 164.

In certain embodiments, the biasing member 166 is a spring. A preferred type of spring for use as the biasing member 166 is a helical spring. In the embodiments illustrated in FIGS. 2 and 5, a first end 178 of the biasing member 166 contacts the first end 172 of the valve body 170 and a portion of the biasing member 166 is provided around the cylindrical protuberance 176. In another embodiment like the one illustrated in FIG. 4, the first end 178 of the biasing member contacts 166 contacts the curvilinear surface of the valve member 164A.

In FIG. 2, the pressure relief valve assembly 68 is shown in an open position. In FIGS. 4 and 5, the pressure relief valve assembly 68, 68A is shown in a closed position. The pressure relief valve assembly 68, 68A is moveable from an open position to the closed position and vice versa. The pressure relief valve assembly 68, 68A is in fluid communication with the tire 50 via the second branch fluid conduit 82, main branch fluid conduit 84, tire valve stem 126 and the tire valve 130. The pressure relief valve assembly 68, 68A allows the assembly 10, 200, 300 to automatically decrease the tire pressure. At a predetermined pressure, the pressure relief valve assembly 68, 68A moves to an open position. When the pressure relief valve assembly 68, 68A is in an open position, the tire 50 is in fluid communication with the atmosphere and the tire pressure is decreased.

The predetermined pressure at which the pressure relief valve assembly 68, 68A moves to an open position can be selected utilizing an adjustment member 168. Also, the adjustment member 168 can be utilized to modify the predetermined pressure at which the pressure relief valve assembly 68, 68A opens. Utilizing the adjustment member 168, the predetermined pressure at which the pressure relief valve assembly 68, 68A opens can be increased or decreased. Preferably, the adjustment member 168 is provided adjacent the first end 162 of the second branch 66 and is in direct contact with a second end 186 of the biasing member 166.

If the tire pressure rises above the selected predetermined pressure, the pressure relief valve assembly 68, 68A will move automatically to an open position to decrease the tire pressure. The pressure relief valve assembly 68, 68A opens as the valve member 164, 164A moves toward the first end 162 of the second branch 66. Movement of the valve member 164, 164A toward the first end 162 of the second branch 66 compresses the biasing member 166. The valve member 164, 164A is moved toward the first end 162 of the second branch 66 by a bias provided directly on the valve member 164, 164A by the tire pressure. When the tire pressure is decreased to a value below the predetermined pressure, the pressure relief valve assembly 68, 68A moves automatically to the closed position.

The pressure relief valve assembly 68, 68A is in the closed position when the valve member 164, 164A provides a seal against the ramped transition portion 158 of the second branch 66. From an open position, the pressure relief valve assembly 68, 68A is moved to the closed position when the valve member 164, 164A moves toward the second end 174 of the second branch 66. The valve member 164, 164A is moved toward the second end 174 by a bias provided directly on the valve member 164, 164A by the biasing member 166.

As shown best in FIGS. 2, 4 and 5, a pneumatic vent 188 is provided over the first end 162 of the second branch 66. If debris were to enter the second branch fluid conduit 82, the debris may become lodged in the pressure relief valve assembly 68, 68A and the pressure relief valve assembly 68, 68A may be prevented from closing. The pneumatic vent 188 prevents debris from entering the second branch fluid conduit 82 but allows pressurized air from the tire to be communicated to the atmosphere. In an embodiment, the pneumatic vent 188 is a screen.

As illustrated in FIG. 5, the third branch 78 comprises an inner surface 190. The inner surface 190 defines the third branch fluid conduit 86. The third branch 78 houses a check valve 192. The check valve 192 is housed entirely within the third branch 78. Preferably, the check valve is of the Schrader variety. The third branch 78 and check valve 192 are provided to allow the tire pressure to be manually checked and/or increased. A removable dust cap 194 may be disposed over an open end 196 of the third branch 78. In an embodiment, the dust cap 194 is secured to the third branch 78 via a threaded connection 198. The dust cap 194 is provided to prevent dirt and debris from entering the third branch 78. If dirt or debris enters the third branch 78, the dirt or debris may become lodged in the check valve 192 and the check valve may be prevented from closing.

After the tire pressure has been checked and/or increased to the target tire pressure, it is preferred that the fluid control circuit 40 is vented. Venting the fluid control circuit 40 is advantageous because it may extend the useful life certain portions of the tire pressure management system 12. For example, when a hose member is provided as a portion of the fluid control circuit 40 and secured to the housing 60, 60A, it is desirable that the hose member is not continuously exposed to pressurized air from the tire pressure management system 12 because such exposure may cause the hose member to fail. When a hose member is provided, venting the fluid control circuit 40 prevents the hose member from continuous exposure to pressurized air from the tire pressure management system 12.

Referring back now to FIG. 1, the fluid control circuit 40 may be vented by directing a flow of the pressurized air from the fluid control circuit 40 to the atmosphere. Directing a flow of the pressurized air from the fluid control circuit 40 to the atmosphere urges the valve assembly 64 to the closed position. The valve assembly 64 is urged into the closed position by the pressure difference between the atmosphere and the tire pressure.

The flow of the pressurized air may be directed from the fluid control circuit 40 to the atmosphere via a chamber 198. In this embodiment, the chamber 198 may be in fluid communication with the atmosphere via a passage 199. After pressurized air is received in the chamber 198, the passage 199 directs the pressurized air in the chamber 198 to the atmosphere.

In accordance with the provisions of the patent statutes, the present invention has been described in what is considered to represent its preferred embodiments. However, it should be noted that the invention can be practiced otherwise than as specifically illustrated and described without departing from its spirit or scope.

The invention claimed is:

1. An assembly for a tire pressure management system, comprising:
 a housing which comprises a first branch and a second branch, the second branch being oriented at an oblique angle with respect to the first branch, wherein the first branch and the second branch are in fluid communication with each other and a main branch, wherein the second branch is formed in a unitary manner with the main branch, the main branch together with the second branch being rotatable with respect to the first branch;
 a valve assembly housed within the first branch, the valve assembly providing selective fluid communication between a portion of the tire pressure management system and the main branch; and
 a pressure relief valve assembly housed within the second branch, wherein the pressure relief valve assembly provides selective fluid communication between the assembly and the atmosphere.

2. The assembly of claim 1, wherein the portion of the tire pressure management system is permanently secured to and in fluid communication with an end of the first branch via a threaded connection.

3. The assembly of claim 1, further comprising a seal member, the seal member disposed around a tire valve stem attached to the main branch and providing a seal between the tire valve stem and the housing.

4. The assembly of claim 1, further comprising a pneumatic vent provided over an end of the second branch.

5. The assembly of claim 1, further comprising a check valve housed within a tire valve stem.

6. The assembly of claim 1, wherein the pressure relief valve assembly is housed entirely within the second branch.

7. The assembly of claim 1, wherein the main branch is in fluid communication with a tire.

8. The assembly of claim 1, wherein the pressure relief valve assembly comprises a valve member, the valve member having an elastomeric seal member which provides a seal near a second end of the second branch, wherein the valve member is contacted by a biasing member, the biasing member biasing the valve member toward the second end of the second branch, and an adjustment member provided adjacent a first end of the second branch and in contact with the biasing member.

9. The assembly of claim 1, wherein second branch is rotatable with respect to the first branch.

10. The assembly of claim 1, wherein the first branch and the main branch are formed as separate members and are secured together via a snap ring.

11. The assembly of claim 1, wherein the main branch has a first receiving end for receiving an end of the first branch and a second receiving end for receiving a tire valve stem.

12. The assembly of claim 1, wherein the valve assembly housed within the first branch is a check valve.

13. The assembly of claim 1, wherein the first branch comprises an outer surface, the outer surface having a first diameter portion attached to a second diameter and the second diameter portion being attached to a third diameter portion.

14. The assembly of claim 1, wherein the housing further comprises a third branch that houses a check valve, the third branch is oriented at an oblique angle with respect to the first branch.

15. The assembly of claim 3, further comprising a depressor member attached to an end of the first branch, the depressor member extending into the main branch to open a check valve provided in the tire stem.

16. The assembly of claim 10, further comprising a sealing member, the sealing member being disposed around the first branch and between the first branch and the main branch to provide a seal between the first branch and the main branch.

17. The assembly of claim 13, wherein the first diameter portion is greater than each of the second diameter portion and the third diameter portion.

18. The assembly of claim 13, wherein the first diameter portion is attached to the second diameter portion by a first ramped transition portion and the second diameter portion is attached to the third diameter portion by a second ramped transition portion.

19. The assembly of claim 14, wherein the third branch is formed in a unitary manner with and is in fluid communication with the main branch.

* * * * *